United States Patent [19]
Dansereau et al.

[11] Patent Number: 5,954,464
[45] Date of Patent: Sep. 21, 1999

[54] METHOD FOR FORMING THE EDGE OF AN AIRFOIL

[75] Inventors: Richard James Dansereau, Cromwell; Edward Charles Toohey, Hebron; John Sebastian Interlandi, Newington, all of Conn.; Steve Joseph Mezei, San Diego, Calif.

[73] Assignee: United Technologies Corporation, Hartford, Conn.

[21] Appl. No.: 08/925,819

[22] Filed: Sep. 5, 1997

[51] Int. Cl.[6] .............................. B23D 1/20; B23Q 16/00
[52] U.S. Cl. .......................... 409/293; 409/120; 409/298
[58] Field of Search .................................. 409/293, 296, 409/303, 308, 313, 326, 346, 297, 298, 131; 29/90.01

[56] References Cited

U.S. PATENT DOCUMENTS

| | | |
|---|---|---|
| 4,149,449 | 4/1979 | Malinowski et al. .................. 409/120 |
| 4,629,378 | 12/1986 | Parsons ................................... 409/133 |
| 4,648,762 | 3/1987 | Hall et al. ............................... 409/303 |
| 4,730,382 | 3/1988 | Parsons ................................... 409/221 |
| 5,054,201 | 10/1991 | Andrews ................................. 409/303 |
| 5,079,821 | 1/1992 | Parsons ................................... 409/131 |
| 5,281,062 | 1/1994 | Dunkman et al. ...................... 409/179 |
| 5,477,721 | 12/1995 | Barnes ..................................... 409/298 |
| 5,761,947 | 6/1998 | Barnes ..................................... 409/298 |

*Primary Examiner*—William Briggs
*Assistant Examiner*—Adesh Bhargava
*Attorney, Agent, or Firm*—Gene D. Fleischhauer

[57] ABSTRACT

A method for forming at least a portion of the edge 12, 14 of an airfoil 10 using a cutting tool 164 is disclosed. Various details of this method are developed which enable incremental removal of material by repetitively moving the tool with respect to the edge while positioning the tool with respect to a spanwisely extending airfoil $R_S$, on the airfoil.

13 Claims, 6 Drawing Sheets

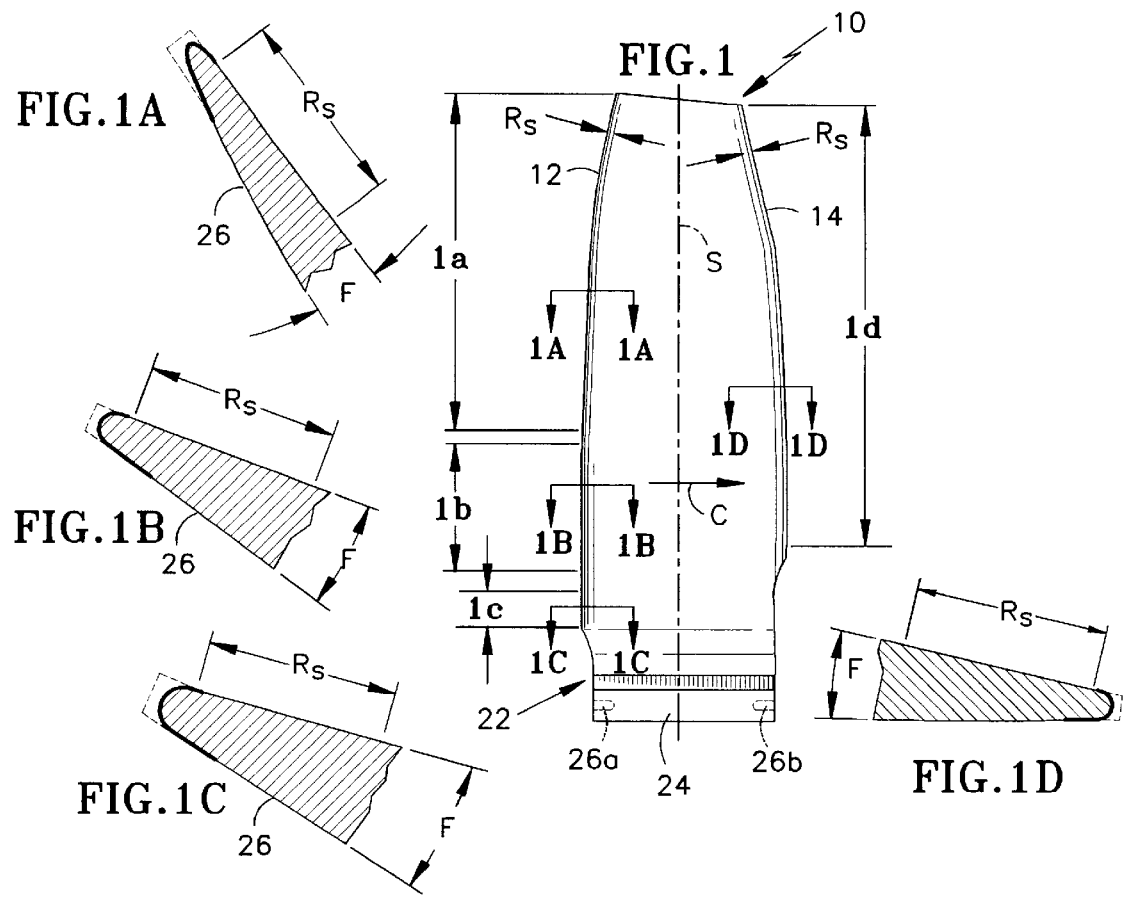
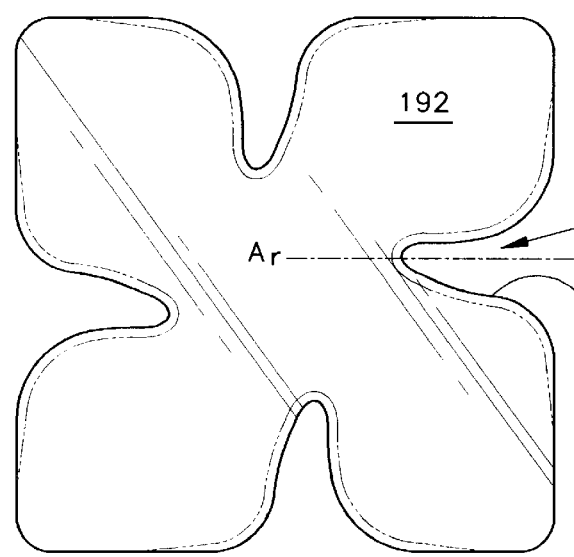
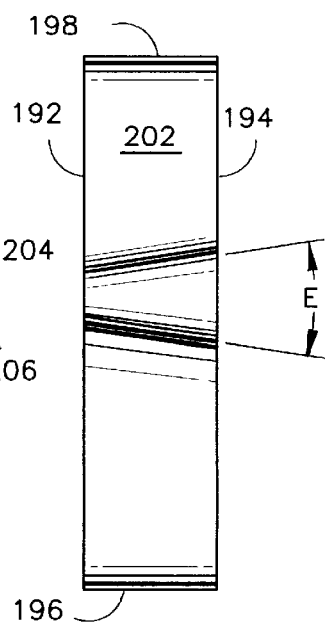

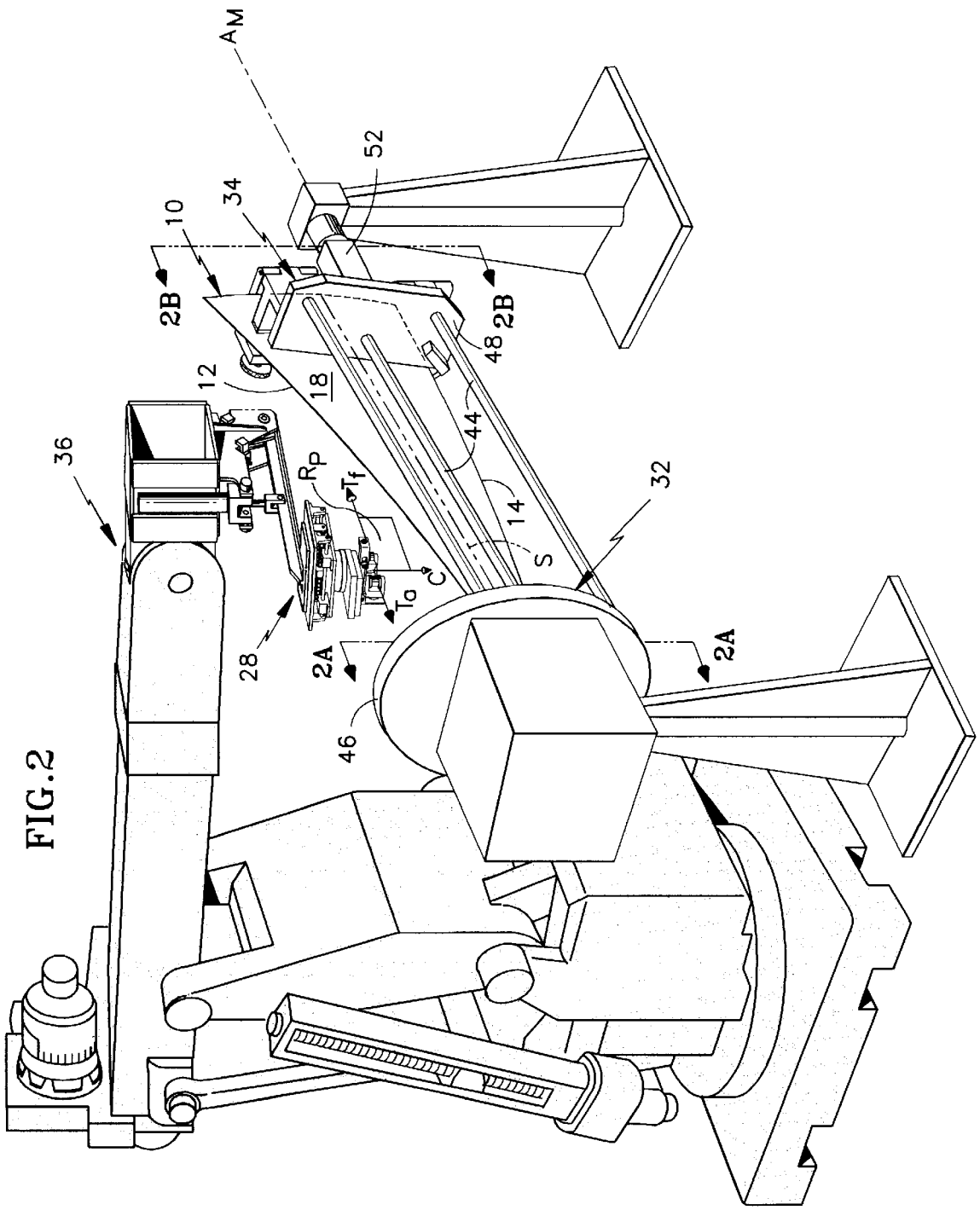

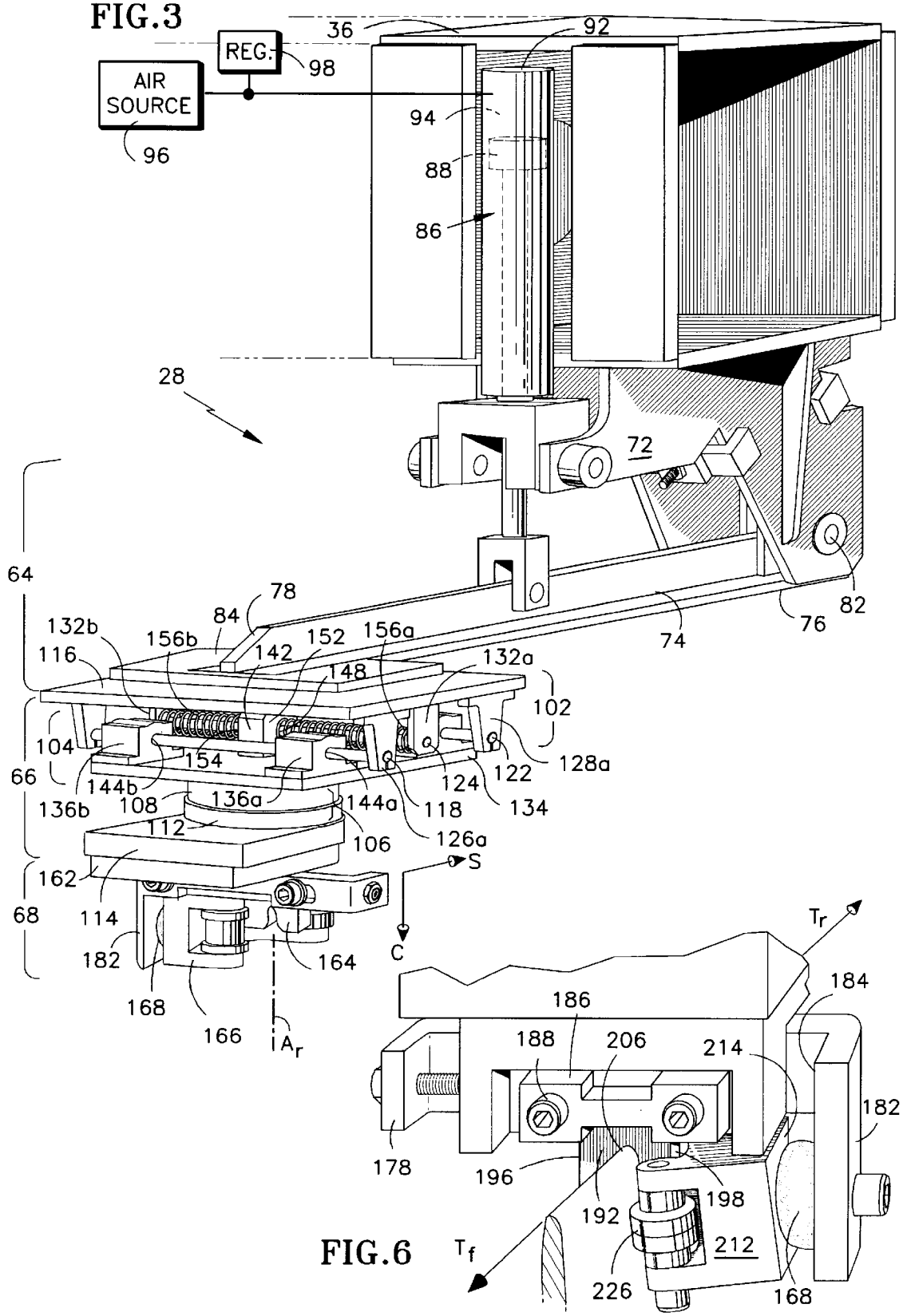

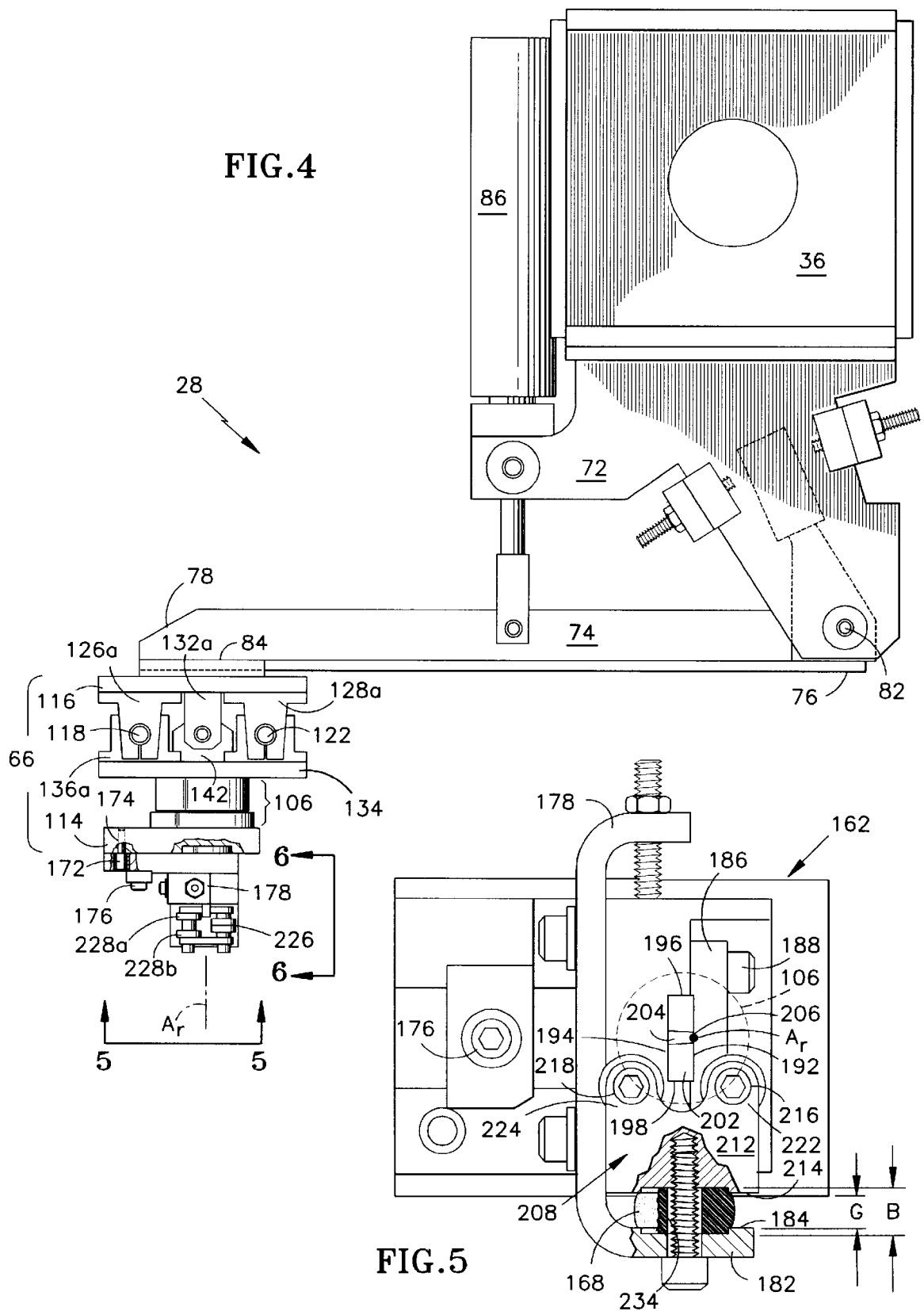

METHOD FOR FORMING THE EDGE OF AN AIRFOIL

TECHNICAL FIELD

This invention relates to the machining of airfoils and more particularly to forming the contour of at least a portion of the leading edge or trailing edge of the airfoil.

BACKGROUND

Axial flow rotary machines, such as gas turbine engines, have pluralities of rotor blades and stator vanes disposed in serial fashion within the compression section and turbine section of the engine. The blades and vanes direct the flow of working medium gases through the engine. As the gases are passed through the engine, energy is transferred between the rotor blades and the working medium gases. In the compression section, each rotor blade has an airfoil which does work on the working medium gases to compress the gases. The surface of the airfoil is defined by a plurality of airfoil sections disposed about the spanwise axis. In the turbine section, the airfoil receives work from the working medium gases as the gases are expanded. In industrial turbines, the flow is discharged through a free turbine to develop rotational energy. In gas turbine engines for aircraft, the flow is then discharged from the engine to generate useful thrust.

The turbofan engine is one type of gas turbine engine used to power aircraft. The turbofan engine has a large fan having fan blades designed to compress working medium gases entering the jet portion of the engine and working medium gases entering the fan (or by-pass) duct.

It is critical for the aerodynamic efficiency of these engines to form within predetermined limits the contour of the leading edge and the trailing edge of the airfoil. This task is complicated in very large airfoils, such as the airfoil for a fan blade, by the extent of the airfoil which may extend for a length of a meter or more. In addition, the airfoil has an amount of predetermined twist and an edge which varies in thickness by a predetermined amount along its spanwise length.

One approach is described in U.S. Pat. No. 5,055,752 issued to Leistensnider et al. which is assigned to the assignee of the present invention. Leistensnider describes numerically controlling the machining system by probing the surface of the work piece along the length of the edge to determine its exact dimension and location. Leistensnider also describes generating and storing data indicative of dimensions and locations for the final product and machining the edge of the work piece under the direction of the machine program which utilizes that data and other preselected part design data to enable a cutting tool to follow the actual edge of the part.

Another approach to shaping the final contour of the airfoil edge is to perform the shaping as a separate operation after the airfoil has at least been partially formed such that portions of the sides of the airfoil have its final configuration, but the leading edge and trailing edges do not. Variations do occur from airfoil to airfoil in intermediate forms (and in final form) for a given engine even though each of the airfoils falls within the predetermined acceptable limits at these finally formed surfaces. Accordingly, a single machine tool having preprogrammed parameters based on these reference surfaces may or may not generate a leading edge whose final contour meets the stringent requirements for airfoil shape along its length.

This approach is particularly suited to making hollow rotor blades, such as hollow fan blades. This approach partially forms the airfoil in flat form and machines the chordwise dimensions of the airfoil leaving the leading edge and trailing edge of the airfoil with an essentially square-like profile. At the time that the chord dimensions are machined, the surface of the airfoil is machined in the edge region adjacent to the edge at a predetermined angle on one of the surfaces, such as suction surface. The concave side serves as a datum edge which allow hand operations to form the airfoil along its length. Prior to hand forming, the flat, hollow airfoil is placed in a mold under an elevated pressure and temperature for hours to twist the airfoil about a spanwisely extending axis. The airfoil is then placed in a second mold and finally formed at another elevated pressure and temperature. The airfoil is then ready for hand operations on the edge.

The hand operations employ files and template gauges having the thickness and the shape that is required. Site gauges are used by the person performing the hand work to form the final edge. As would be expected, there are minor variations between the edges of airfoils that are formed by the same operator even though the edge does meet blueprint dimensions.

The above art notwithstanding, scientists and engineers working under the direction of Applicants' assignee have sought to develop an apparatus and method for generating an airfoil edge which would decrease the variability of the edge with respect to blueprint dimensions while increasing the speed with which an edge may be formed.

SUMMARY OF INVENTION

This invention is in part predicated on the recognition that a tool having a shape of the airfoil edge may be used to precisely form the edge region of an airfoil provided that wave-like variations in the edge and other variations in the airfoil are accommodated.

According to the present invention, a method for forming the contour of at least a portion of a leading edge or a trailing edge of an airfoil includes disposing a tool having the shape of the edge adjacent the edge, engaging a spanwisely extending reference surface on the airfoil to position the tool, applying a force to the tool, and removing material by repeatedly moving the tool relative to the edge in the spanwise direction while positioning the tool during travel with respect to the spanwisely extending surface.

In accordance with the present invention, one detailed method includes permitting at each airfoil section limited movement of the tool with respect to the reference surface against a restoring force acting in the chordwise direction and a restoring force acting circumferentially about the chordwise direction to avoid gouging and chatter marks on the airfoil as the tool is moved and positioned to form the desired contour with respect to the reference surface.

In accordance with the present invention in another detailed method, the step of permitting limited movement of the tool with respect to the reference surface includes permitting limited movement against a restoring force acting in a direction substantially perpendicular to the reference surface to accommodate deviations in thickness of the leading edge.

In accordance with the present invention, the step of engaging the reference surface includes engaging the surface with two rotatable surfaces attached to and disposed fore and aft of the tool in the spanwise direction and probing the reference surface continuously by rolling the rotatable surfaces on the reference surface.

A primary feature of the present invention is the use of a reference surface to directly control a path of a cutting tool.

Another feature is disposing a cutting tool having the shape of the edge adjacent the edge to form the shape of the edge of the airfoil. Still another feature is repetitively moving the cutting tool with respect to the edge while applying a force to the cutting tool to remove the necessary material.

In one particular detailed method, a feature of the method is probing the reference surface by using two rolling surfaces to engage the reference surface during generation of the contour of the airfoil edge. Still another feature of the invention is permitting limited movement of the tool with respect to the reference surface to allow the tool to adjust for variations and compliantly engage the surface without causing vibrations in the tool that would result in chatter marks or gouges on the airfoil.

A principal advantage of the present invention is the engine efficiency which results from the employing airfoils having leading edges and trailing edges which are closely matched and conform to predetermined specifications. Still another advantage is the reduced amount of time required to form the contour of the edge using this method as compared to edges formed by hand operation. Still another advantage is the consistency in dimension of the leading edge and trailing edge as compared to such edges which are formed by hand operations along the entire length of the edge. Another advantage is the reduced scrappage which results from avoiding chatter marks and gouges in the leading edge by compliantly following variations in the contour and thickness of the leading edge. Finally, an advantage is the durability and cutting ability of a tool formed with a surface which diverges rearwardly away from the cutting edge with respect to the direction of travel of the cutting edge.

SUMMARY OF APPARATUS

According to the present invention, an apparatus for forming a contour of a leading edge includes a tool having a shape which is substantially the same as the shape of the edge to be formed which is attached to a probing element that is movable with respect to a reference surface on the airfoil to guide the tool.

In accordance with one detailed embodiment of the present invention, a coupling assembly is disposed between a force transmitting element to transmit the force required to remove material, the force transmitting element providing a constant force through a device operated at constant pressure while the coupling element urges the probe element into contact with the reference surface during initial engagement of the tool with the edge and accepts limited circumferential movement of the tool and coupling element about an axis extending in the chordwise direction while applying a restoring force to urge the tool back into the predetermined alignment with the reference surface.

In one detailed embodiment, a resilient material is disposed between the probe assembly and the tool such that limited movement is permitted along a line substantially perpendicular to the reference surface with a restorative force being exerted on the probe element should the probe element move in such a direction.

In accordance with one detailed embodiment, the probe assembly includes a pair of rolling elements disposed on either side of the tool fore and aft with respect to the direction of travel of the tool to provide a planar-like datum for controlling movement of the tool with respect to the reference surface.

A primary feature of the present invention is a tool having an edge that is of shape which is substantially the finished shape of the leading edge. The shape of the edge in the inner portion conforms to the shape of the finished edge. Another feature is a tool assembly to which the tool is attached. The tool assembly includes a probe assembly having, in one detailed embodiment, a rolling element which adapts the tool assembly to engage an airfoil. Another feature is a coupling assembly having rod and spring elements for applying a bias force urging the probe element into engagement with an airfoil during initial engagement of the tool with the edge of the airfoil and a torsional coupling for permitting a limited amount of circumferential movement.

A primary advantage of the present invention is the elimination of most of the hand labor required to form the edge region of an airfoil. Another advantage is the close tolerance with which the airfoil edge region may be formed which results from the shape of the tool, the fine repeatable cuts provided by the apparatus and the elimination of human error in hand forming operations. Still another advantage is the volume of production which results from the minimal set up time and speed at which the edge may be formed using a tool assembly which mechanically engages the reference surface and transmits through a mechanical linkage the position of the tool with respect to the reference surface in analog fashion.

The foregoing and other features of the present invention will become more apparent from the following description and accompanying drawings.

BRIEF DESCRIPTION OF THE DRAWINGS

FIG. 1 is a side elevation view of an airfoil in intermediate form during manufacturing operation of the airfoil, the airfoil having an unfinished leading edge, an unfinished trailing edge and a false root.

FIGS. 1A–1D are cross-sectional views of airfoil sections broken away to show the unfinished airfoil leading edge and the unfinished trailing edge with broken lines and with the finished contour in full and darkened where machining is required.

FIG. 2 is a perspective view showing an airfoil, an apparatus for contouring the edge of the airfoil fixturing for holding the airfoil during contouring of the edge of the airfoil, and a robotics device for moving the apparatus.

FIG. 3 is an enlarged view of a portion of the apparatus shown in FIG. 2 showing in more detail a portion of the robotics device that moves in reciprocating fashion and the assemblies of the apparatus that are moved in reciprocating fashion by the robotics arm.

FIG. 4 is a side elevation view of a portion of the blade contouring assembly shown in FIG. 1.

FIG. 5 is a view from below of a portion of the tool assembly shown in FIG. 4.

FIG. 6 is an enlarged view of the tool assembly shown in FIG. 4 moving in the forward direction of travel Tf.

FIG. 7A is a front view of one tool used to form a portion of the contour of the leading edge.

FIG. 7B is a side elevation view taken along the Lines 7B—7B of FIG. 7.

BEST MODE FOR CARRYING OUT THE INVENTION

Figure 2A:
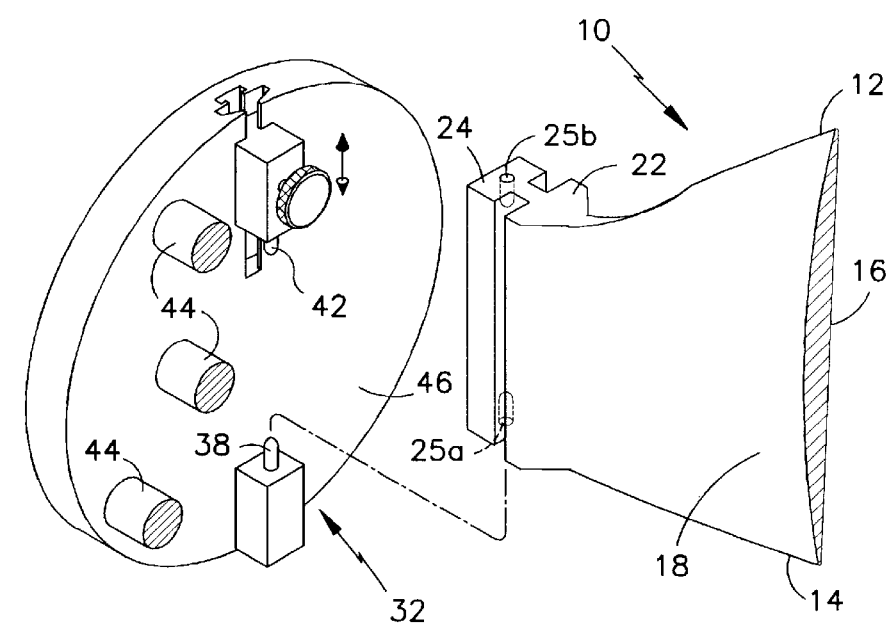
FIG. 2A is a partial perspective view of a portion of FIG. 2 showing a fixturing device for holding the root for an airfoil.

FIG. 1 shows an airfoil 10 for the compression section (not shown) of a gas turbine engine, such as the fan section of the engine. The airfoil has a spanwisely extending axis S. A plurality of airfoil sections are disposed about the axis S and each extends in the chordwise direction C to define the surface of the airfoil.

The airfoil shown is in intermediate form having an unfinished leading edge 12 and an unfinished trailing edge 14 which extend in the spanwise direction. In the finished condition, the airfoil edges have a constant shape in the distinct regions of the airfoil 1a, 1b, 1c and 1d. Small gaps between airfoil edge regions 1a and 1b, and airfoil regions 1b and 1c are used to provide a transition in the finished airfoil.

A pressure surface 16 on one side of the airfoil and a suction surface 18 on the other side extend to the edges 12, 14. The airfoil has a tip 20. Finished surfaces are provided on the pressure surface (concave surface) and at least a portion of the suction surface (convex surface) of the airfoil. The finished surface on the pressure surface includes a reference surface Rs. The reference surface Rs is useful for forming the contour on the leading edge. A second reference surface (also Rs) is useful for forming the contour of the trailing edge.

A root attachment 22 is integral with the airfoil for mounting the fan blade in a rotor disk under operative conditions. A false root 24 is attached to the root attachment and is integrally formed with the root attachment. The false root is engaged by a fixture (shown in FIG. 2) during machining operations to support the root of the airfoil. The false root includes a pair of indentations 25a and 25b for receiving holding pins. After completion of the necessary machining operations, the false root is machined off the airfoil.

The leading edge 12 and the trailing edge 14 in the intermediate form of the airfoil are squared off in cross section as shown by the dotted lines. FIGS. 1A, 1B, 1C and 1D show airfoil sections taken along the lines 1A—1A, 1B—1B, 1C—1C, and 1D—1D that are broken away to show the edge regions 1a, 1b, 1c and 1d of the airfoil section. The desired contour of each edge in these regions is shown by the solid dark line. Each of the airfoil sections has a flare angle F which is the angle between the finished referenced surface Rs and a finished portion 26 of the suction surface 18 on the convex side of the airfoil. This angle may range within a tolerance band between, for example, 18 degrees and 21 degrees at the particular airfoil sections shown in FIGS. 1A, 1B and 1C and between 20 to 23 degrees as shown in FIG. 1D.

FIG. 2 is a perspective view of an apparatus 28 for contouring the edges 12, 14 of the airfoil. The apparatus is shown in full. An airfoil in intermediate form is also shown in full with fixtures 32, 34 shown in schematic fashion for holding the airfoil in place during contouring of the edge of the airfoil.

The direction of travel of the apparatus is shown by the arrows T that show the fore (Tf) and aft (Ta)reciprocating action of the apparatus during the contouring operation of the edges 12, 14. The direction of travel T is substantially parallel to the spanwise direction S and is parallel to the edge of the airfoil. The apparatus provides an abrading or cutting action, such as a scraping action, a shaving action or a sanding action, depending on the type of cutting device selected, as the apparatus 28 is moved forwardly in the direction Tf. No cutting is provided as the apparatus is moved in the aft direction Ta. With repeated cuts, the apparatus moves downward in the chordwise direction C as the cutting edge of the apparatus moves downwardly with the removal of material. The chordwise direction C in which the tool moves downwardly and the direction of travel of the apparatus which is substantially parallel to the spanwise axis S provide reference directions and a plane of reference Rp for the following description.

The apparatus 28 is capable of being driven with reciprocating motion in the spanwise direction by many devices. In the particular embodiment shown, an exemplary device is the robotic device 36, ASEA 90 model robot with DP/2 software, manufactured by ABB Robotics Inc., 2487 South Commerce Drive, New Berlin, Wis. 53151-717. Any other suitable device may be used and, in fact, providing there is a suitable guide and a suitable means for applying force through the apparatus, the device could be reciprocated by hand.

As shown in FIG. 2, the leading edge 12 is positioned adjacent the apparatus 28 and the trailing edge 14 is facing down. The fixtures 32, 34 enable the airfoil to be rotated 180 degrees about the axis of the fixture Af such that the trailing edge may be rotated into the position of the leading edge. As described below, a portion of the apparatus may be releasably adjusted such that the apparatus engages the reference surface Rs for the trailing edge and allows use of the same apparatus for forming either the leading edge or the trailing edge.

FIG. 2A is a view of the fixture 32 shown in FIG. 2 taken along the lines 2A—2A. As shown in FIG. 2A, the false root 24 attached to the airfoil 10 of the rotor blade is trapped by a first pin 38 which engages the first pin opening 25a and a second pin 42 which is slideable to engage the second pin opening 25b. Support members 44 projecting from the base 46 of the fixture brace the root attachment 22 and false root 24 attached to the airfoil against movement.

Figure 2B:
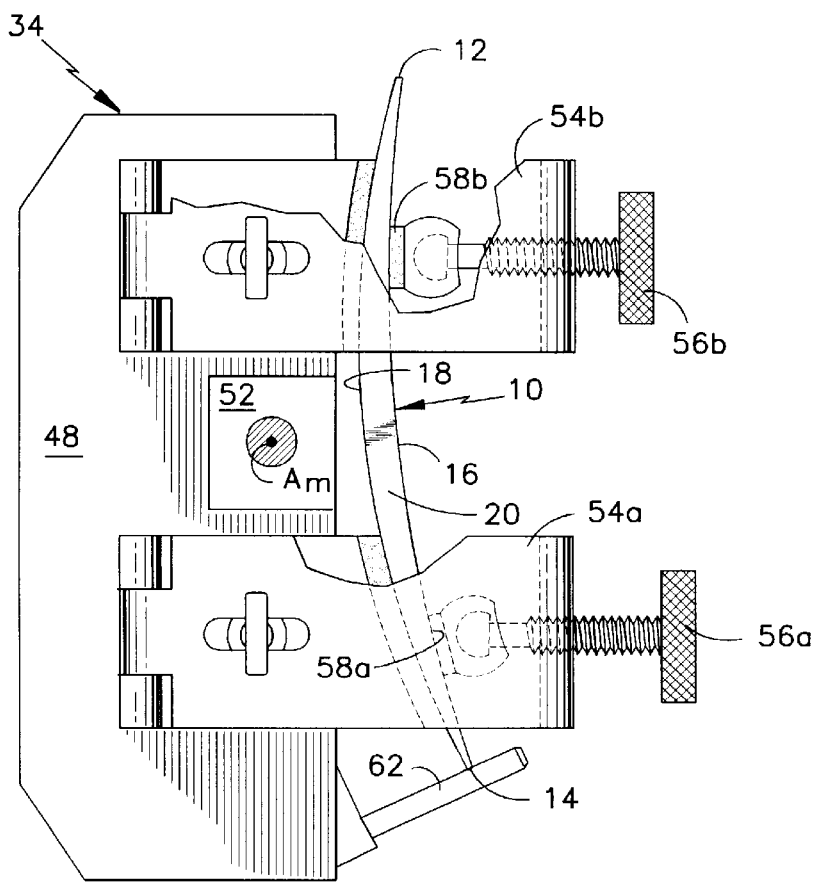
FIG. 2B is a side elevation view of a portion of FIG. 2 showing a fixturing device for holding the tip of an airfoil.

FIG. 2B is a view taken along the lines 2B—2B of FIG. 2 showing the fixture 34 for engaging the tip 20 of the airfoil. The fixture includes a plate 48 partially supported by the rod-like support members 44 from the base 46 of the fixture 38 shown in FIG. 2A. In addition, the plate is supported through the member 52 which allows the airfoil to be rotated about the axis Am. The fixture is provided with clamping sleeves 54a, 54b which clamp against the airfoil tip 20 and thumb screws 56a, 56b having surfaces 58a, 58b that are rotatable about the end of the thumb screw to engage the tip of the airfoil. A brace 62 extends from the fixture to support the edge of the airfoil that is not being machined.

FIG. 3 is an enlarged view of a portion of the apparatus 28 shown in FIG. 2 and a portion of the robotic device 36 that moves the apparatus for contouring the edge in reciprocating fashion. The apparatus includes a base and arm assembly 64, a coupling assembly 66, and a tool assembly 68. The base and arm assembly includes a base 72 which is attached to the robotic device. An arm 74 extends in the spanwise direction from the base and has a first end 76 and a second end 78. The first end rotatably engages the base at a pivoted joint 82. The second end has a plate 84 for engaging the coupling assembly. A pneumatic cylinder 86 is attached to the base and a piston 88 is disposed in the pneumatic cylinder. The piston is spaced from the end 92 of the pneumatic cylinder leaving a chamber 94 therebetween. The chamber is in flow communication with an electronic regulator 96 and with a source of air 98 (shown in schematic fashion) to provide a gas, such as air, which is at a constant pressure in the chamber. Satisfactory devices for the pneumatic cylinder, piston and regulator are available from SMC Pneumatics Inc., 461 Boston Street, Suite #B6, Topsfield, Mass. 01983, who also manufactures the regulator, Model Number NIT202-302BG.

The coupling assembly 66 includes a first plate assembly 102, a second plate assembly 104 and a torsional coupling assembly 106. A suitable torsional coupling assembly is available from Lucas Aerospace, Power Transmission, 211 Seward Avenue, P. O. Box 457, Utica, N.Y. 13503, Flex Joint Apparatus Model Number 5032-600. The diameter of the torsional coupling assembly is about one (1) inch. The torsional coupling assembly has a first cylinder 108 and a second cylinder 112. The cylinders are disposed about an axis of rotation Ar. The first and second cylinders of the coupling assembly are interconnected by mechanical means (not shown) to allow a limited amount of circumferential movement between the cylinders in response to a torsional or rotational force exerted on coupling assembly by the tool assembly. Other torsional coupling assemblies using non-mechanical means to generate a torsional force may be employed.

The axis of rotation Ar of the torsional coupling assembly intersects the tool assembly at a predetermined location. The reciprocating motion of the apparatus causes the axis of rotation of the torsional coupling assembly to define a reference plane Rt in the limit between two closely adjacent positions as the apparatus is moved. In the limit, the movement of the axis of rotation Ar defines a reference plane Rt which is substantially parallel to the spanwise direction of the airfoil and the reference plane Rp. As will be realized, small local deviations of the airfoil surface in the edge being formed may cause the plane to be not exactly parallel but substantially parallel to the spanwise axis of the airfoil.

The coupling assembly includes a flat plate 114 which is adapted to releasably engage the tool assembly 68. The first plate assembly 102 of the coupling assembly has a plate 116. The plate 116 is attached to the plate 84 of the base and arm assembly to interconnect the base and arm assembly 64 with the tool assembly 68. The first plate assembly includes a first guide rod 118 and a second guide rod 122. A third guide rod 124 is disposed between the first and second guide rods. The guide rods extend substantially perpendicular to the spanwise direction S and accordingly to the reference planes Rp and Rt. Each of the rods is spaced spanwisely from the adjacent rod. Three pairs of flanges, as represented by the flanges 126a, 128a, and 132a extend from the first plate to engage the ends of the guide rods to support and position the guide rods.

The second plate assembly 104 has a second plate 134. The second plate is attached to the first cylinder 108 of the torsional coupling assembly 106 and extends parallel to the first plate 116 of the first plate assembly 102. The second plate assembly has a first pair of blocks 136a, 136b attached to the first plate. A second pair of blocks 138a, 138b (not shown) is attached to the first plate and spaced spanwisely from the first pair of blocks. Each of the first pair of blocks has a hole 144a, 144b which adapts the block to slideably engage the first rod 118 of the first plate assembly. The second pair of blocks has similar holes as represented by the hole 146a in block 138a, which adapt the second pair of blocks to slideably engage the second rod 122. A fifth block 142 is disposed midway between the flanges 132a, 132b that engage the ends of the third rod. The fifth block has a hole 148 which adapts the block to engage the third rod 124. The block has a pressure side 154 and a suction side 152. A pair of springs 156 encircle the third rod with one spring 156b being disposed between the pressure side of the fifth block and the adjacent flange 132b and the second spring is disposed between the suction side 152 of the fifth block and the adjacent flange 132a. The block and rod engagement with the springs enables the first and second plate assemblies to move with respect to each other in a direction which is substantially perpendicular to the spanwise direction and the reference planes Rp and Rt, with a restorative force being exerted by the springs should the plates be moved relative to each other in a direction perpendicular to the spanwise direction. As will be realized, the first and second plate assemblies might be reversed with the first plate assembly 102 being attached to the torsional coupling assembly 106 and the second plate assembly 104 being attached to the base and arm assembly 64.

FIG. 3 shows a portion of the tool assembly which is also illustrated in more detail in FIGS. 4, 5 and 6. For example, FIG. 4 shows a side elevation view of the tool assembly; FIG. 5 is a view from below of a portion of the tool assembly; and FIG. 6 is a view of the tool assembly taken along the lines 6—6 of FIG. 4.

The tool assembly 68 includes a tool base 162, a tool 164, a probe assembly 166, and an elastic bushing 168. As shown in FIG. 4, the tool base is releasably attached to the plate 114 of the coupling assembly 66. The tool base has a pin 172 which cooperates with a hole 174 in the coupling assembly which enables the tool to be clamped to the coupling assembly such as by a bolt 176 and unbolted and turned 180 degrees to face in the opposite direction.

The tool base 162 includes a bracket 178 that is attached to a portion of the tool base. The bracket has a flange 182 having a surface 184 extending parallel to the reference planes Rp, Rt and substantially parallel to the reference surface Rs of the airfoil under operative conditions.

The tool assembly includes the tool 164. The tool is releasably attached to the tool base such as by clamping with a bar and a pair of bolts, as represented by the bar 186 and bolt 188 in FIG. 5. The clamped tool acts as a one-piece construction with the tool base. The tool has a front surface 192 and a rear surface 194. A suction side 196 extends from the front surface to the rear surface. The tool also has a pressure side 198 (shown in FIGS. 5 and 6) which also extends from the front surface to the rear surface. The tool has a cutting face 202 extending between the pressure side and the suction side. A concave surface 204 is disposed between the sides and intersects the front surface at a cutting edge 206.

The tool assembly also includes the probe assembly 166. The probe assembly includes a probe 208 having a probe base 212 which has a surface 214 extending parallel to the surface 184 of the bracket 178 leaving a gap G therebetween. The bushing 168 is disposed in the gap. The bushing is formed to a polyurethane material that is available from Associated Spring, P. O. Box 120, Bristol, Conn. 06011 and is formed of polyurethane material used for part number PO312-0500-60A. The spring constant of the bushing is much greater than the spring constant of the springs 156a, 156b.

The probe includes a first roller assembly 216 and a second roller assembly 218 which adapt the probe to roll on the pressure surface 16 of the airfoil under operative conditions. A first pair of flanges 222 extend from the probe base and substantially perpendicular to the reference plane direction Rp, Rt and to the spanwise direction S of travel. The flanges are spaced chordwisely one from the other. Each has a pin (not shown) extending between the flanges which rotatably engages at the first roller assembly. A second pair of flanges, as represented by the flange 224 are spaced spanwisely from the first pair of flanges and substantially perpendicular to the reference surface Rs and the spanwise direction of travel. The flanges are spaced chordwisely as are the flanges of the first pair of flanges and similarly have a pin extending between the flanges (not shown) which is adapted to rotatably engage the roller assembly.

The first roller assembly 216 has a pair of roller elements which are chordwisely adjacent as represented by the roller elements 226. The roller elements are spaced chordwisely from and spanwisely forwardly of the front surface 192 of the tool and adapt probe assembly to engage the reference surface Rs of the airfoil. The second roller assembly 218 has a pair of roller elements 228a, 228b which are chordwisely spaced one from the other and are spaced chordwisely from and spanwisely rearwardly of the rear surface of the tool. The second roller assembly adapts the probe assembly 166 to engage the reference surface Rs of the airfoil at a location which is slightly rearward of the tool. The slight curvature of the reference surface results in point-like contact between each roller element and the reference surface as a result, the contact points define a plane-like reference for the orientation of the roller assembly and the tool.

FIG. 4 shows in more detail portions of the coupling assembly and the probe assembly. For example, FIG. 4 shows the relationship of the flanges to the rod 118, 122 and to the blocks and of the third set of flanges 132a, 132b and the third rod 124 to the center block which engages the springs. The axis of rotation Ar of the coupling assembly extends through the tool 164, preferably through the intersection of the front surface 192 of the tool with the concave surface 204 but experience has shown that acceptable results can be obtained by having the axis extend through a portion of the tool rearwardly of this location. As noted earlier, the front roller assembly is rotatably supported from the flanges by a pin extending through the flanges.

As shown in the FIG. 5, the surface of the bracket is substantially parallel to the surface of the probe and traps the bushing between the two surfaces. The bushing 168 has an uninstalled thickness B which is greater than the gap G. The bushing has a hole 234 extending therethrough which adapts the bushing to slideably receive a bolt 236 extending through the bushing. The bolt 236 for attaching the probe base 212 to the flange 182 of the bracket 178 extends through the hole in the bushing. The bolt slideably engages the hole through the bracket so that the probe base can compress the bushing slightly further if necessary under operative conditions. This will occur should the probe base move relative to the bracket in a direction substantially perpendicular to the reference surfaces Rp, Rt.

As shown in FIG. 6, the direction of travel of the tool assembly under operative conditions is shown by the arrows Tf and Tr. As shown in FIGS. 5 and 6, the bracket includes a locating bolt 238 which enables adjusting the position of the bracket by loosening bolts. Such an adjustment may be made as one tool is exchanged for another to contour a new section of the edge. After the bolts are reinstalled, the bracket is integrally attached to the tool base.

FIG. 7A is a front view of the tool. The front surface 192 of the tool intersects the concave surface 204 (extending inwardly from the cutting face 202) at the cutting edge 206. The cutting edge at the inward most portion of the concave surface conforms to the finished dimension edge of the leading edge 12 of the airfoil.

In order to make efficient use of the tool piece, four concave surfaces are cut into the tool. However, one concave surface is used at a time to form the contour of the leading edge of the airfoil. Accordingly, the three other concave surfaces are ignored with regard to the description of the tool. Thus, the surface in which the concave surface being used for the forming operation is the cutting face 202. The pressure side 196 and suction side 198 extend on either side of the cutting face extend from the front surface to the rear surface 194. The concave surface disposed between the sides has a pressure side wall 242 and a suction side wall 244 extending outwardly in divergent fashion about the axis Ar. The concave surface intersects the front surface at the cutting edge 206. As shown in FIG. 7B, the sides diverge rearwardly toward the rear surface at an angle E shown in exaggerated fashion, for example, of about 4 degrees. The angle is referred to as the edge relief angle and promotes the cutting action of the tool with respect to the edge of the airfoil by passage of the airfoil rearwardly without bending.

Figure 8:
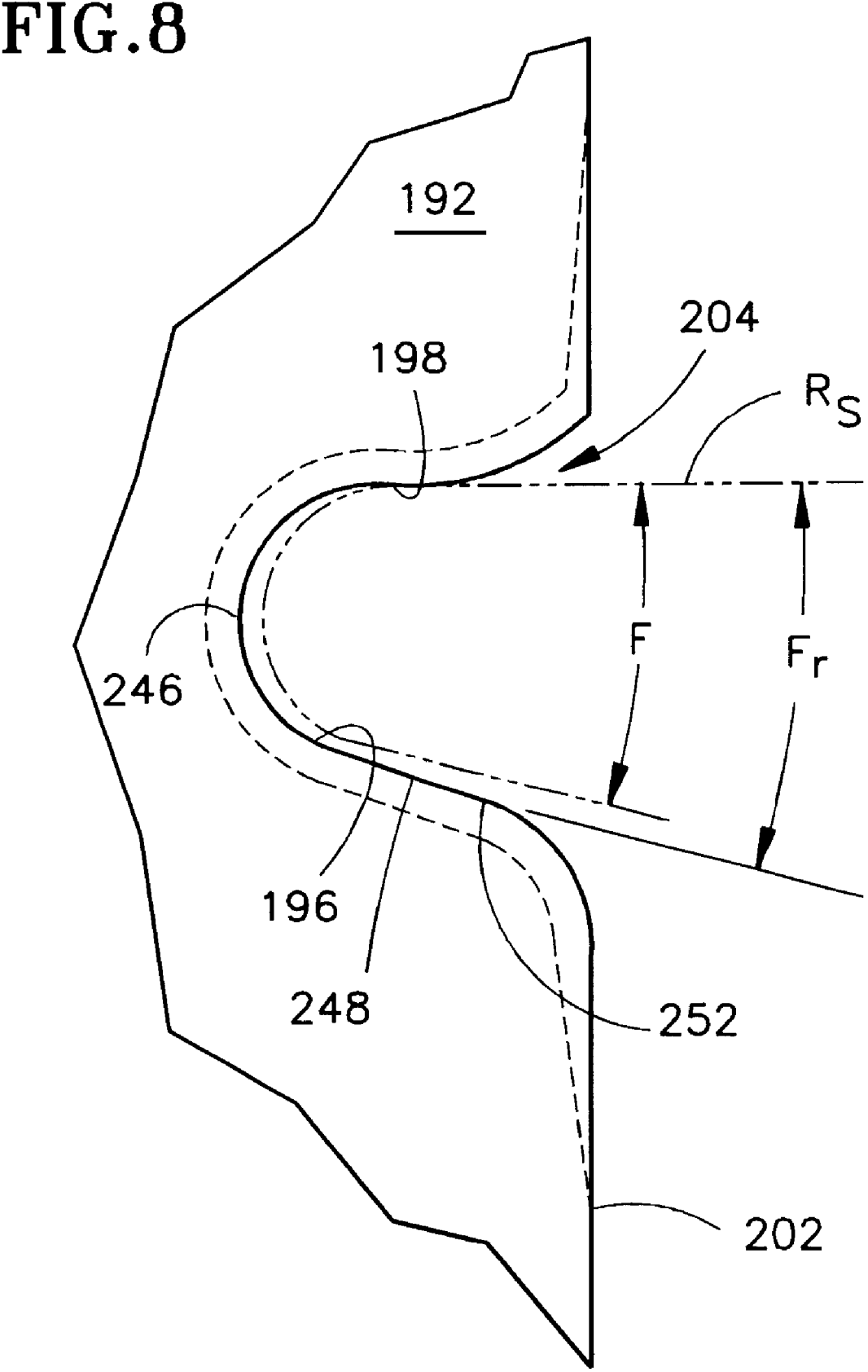
FIG. 8 is a front view of a second tool used to form the contour in the region 1 C of the leading edge.

FIG. 8 is an enlarged view of the concave surface 204 of the tool 164 used to form the contour of the leading edge 12 of the airfoil section shown in FIG. 1C. The phantom line shows the airfoil in its fully machined condition and showing the reference surface Rs on the airfoil surface which was unchanged by the contouring operation which formed the edge. The flare angle F is the angle between the concave pressure side surface 16 and the convex suction side surface 18 of the airfoil as measured between the finished machine convex side and the finished machine concave side (that is, the reference surface Rs).

During the formation of the contour of the leading edge 12, the desired leading edge is formed at the leading edge between the machined reference surfaces Rs on the concave pressure side and the machined surface on the convex suction side. Accordingly, the tool cutting edge 206 (at the intersection of the concave surface with the front surface of the tool) has an inner portion 246. The inner portion of the tool edge conforms to the contour of the finished leading edge of the airfoil. The middle portion 248 of the tool edge is relatively flat and diverges at an angle Ft. The angle at which the edge diverges may be equal to or greater than the nominal tolerance angle between the flare edges. For example, should the range and acceptable flare angles lie in a tolerance range of 18 degrees to 21 degrees, the angle of divergence of the middle portion of the edge will lie at the upper end of the range (21 degrees) or at the nominal tolerance 19.5 degrees, but preferably not at the minimum acceptable flare angle of angle 18 degrees. The outer portion 252 of the tool edge extends in curvilinear fashion tangent to the middle portion and in a reverse curve toward and possibly tangent to the cutting face 202 to provide a wide mouth relative to the airfoil edge in the unfinished condition. This enables the tool to engage a leading edge of an airfoil that has a flare angle at the high end of the tolerance range with a first cut that removes only a slight amount of material adjacent the surface defining the flare angle as the cutting tool seats on the leading edge. During the first cut on the leading edge of an airfoil having a flare angle at the minimum angle in the tolerance range (18 degrees), the cutting tool does not engage the material adjacent the flare angle but will gradually engage that portion of the leading edge as material is removed during subsequent passes.

As mentioned earlier, the method of forming the intermediate form of the airfoil is particularly useful during formation of a hollow airfoil 10 for a fan blade. The blade pieces are bonded together in flat form. The chord dimensions are machined in the blade. At the completion of the machining operation, the leading edge 12 and trailing edge 14 of the airfoil are essentially square. The flare angle F that it adjacent to the shape to be formed on the leading edge (the flare angle) is machined to a predetermined amount within the tolerance range. At the leading edge, the angle may be 18 degrees with a tolerance range of 18 degrees to 21 degrees.

On the trailing edge, the flare angle may be 20 degrees with a tolerance range of 20 to 23 degrees. Thereafter, the airfoil is twisted and hot formed to form the final contour of the airfoil.

The operations of twisting and hot forming take place at high temperatures and in molds which subject the airfoil to large compressive loads to achieve the final form of the airfoil. This introduces waviness at the airfoil edge in the chordwise direction so that in a side view the airfoil appears to have very slight scalloped portions extending between a reverse curve projection that somewhat resembles a gentle undulation or sine wave. In addition, the same waviness is introduced in a direction that is substantially perpendicular to the suction side and pressure sides of the airfoil and extends from the leading edge to the reference surface Rs. In a front view of the airfoil, the airfoil has slight undulations or a slight sine wave appearance in the lateral direction with respect to the spanwise axis. Finally, the thickness of the squared-off edge in one of the sections 1a, 1b, 1c or 1d may vary in the lateral direction from one location in the section to another.

During operation of the apparatus 28 for forming the contour of the leading edge 12, the apparatus is lowered into position above the fixtured airfoil 10. The fixtures engage the false root 24 and tip 20 of the airfoil as described above to firmly hold the airfoil in position. As the apparatus is lowered, the rollers 226, 228 of the roller assemblies 216, 218 engage the concave pressure side 16 of the airfoil causing the apparatus to move slightly in the chordwise direction C by compression of one of the two springs 156a, 156b that enable the coupling assembly 66 to permit movement of the tool assembly 68 in the chordwise direction. The cutting tool 164 engages the leading edge, seating the tool and thus the apparatus on the leading edge. The engagement causes the reference surface Rs on the concave pressure side to exert a compressive force on the rollers compressing the bushing 168 that is disposed between the probe assembly 166 and the bracket 178 of the tool base 162. This causes a predetermined amount of compression of the bushing.

The robotic driving device 36 causes the apparatus 28 to move in reciprocating fashion along a predetermined length of the airfoil 10. The length is appropriate to the tool 164 that is selected to form the contour on the suction surface 18 of the leading edge 12 and on a small portion of the pressure surface 16 adjacent the reference surface Rs as shown by the thickened line in the FIGS. 1A–1D. Material that is abraded by the leading edge falls away from the cutting edge. Movement without binding between the tool and the leading edge is aided by the rearwardly divergent sidewalls 242, 244 of the concave surface 204 of the tool.

The pneumatic cylinder 86 applies a scraping or turning force to the tool through the piston arm 89, the clevis joint 90 and the coupling assembly 66. No further adjustment takes place between the plate assemblies 102, 104 of the coupling in the chordwise direction by reason of the slideable engagement between the rods and blocks of the plate assemblies. The tool is seated on the leading edge and travels to and fro tracking on the leading edge.

The pneumatic cylinder 86 and piston 88 provides the shaping or cutting force and, depending on the contour of the cutting edge, material is removed on the top or the sides of the leading edge 12. The compressive force exerted by the bushing 168 urges the side of the tool 164 into contact with the suction surface 18 to enable the force exerted by the cylinder on the tool to cause cutting of the suction surface. The amount of material removed is dependent on the level of force exerted through the pneumatic cylinder. Once the predetermined force level is reached for the thickness of the material, the tool does not have a level of force which would cause the tool to cut deeper into the material and possibly cause chattering of the tool.

As the tool is moved in the cutting direction, the tool may encounter a surface that is sinusoidal in the chordwise direction. This would appear as an up and down movement for the tool for the orientation of the airfoil shown in FIG. 2. The pneumatic cylinder 86 and piston 88 provides a constant force which causes the tool to follow the downward curve of the leading edge away from the tool with a constant force provided by additional air supplied through the regulator 98 to the pneumatic cylinder. As the tool rides up the curve, air is removed from the cylinder enabling the force to remain constant. The air cylinder provides damping to any vibration of the tool that may take place as the tool moves in the chordwise direction C along the sinusoidal upward and downward surface of the leading edge. Thus, the pneumatic cylinder permits limited movement of a tool with respect to the reference surface against a restoring force that is exerted by a pneumatic cylinder that acts in the chordwise direction.

As the tool 164 moves along a portion of the leading edge that has a curve moving to and fro in the lateral direction, the front (first) roller assembly 216 and the rear (second) roller assembly 218 are urged in the direction that the surface is curving by the reference surface Rs which is closely adjacent to the leading edge. The front roller assembly positions the tool so that it is moving parallel to the leading edge by causing a small rotation of the tool about the chordwisely extending axis Ar that extends through the torsional coupling assembly 106. The torsional coupling assembly enables this slight rotational movement but at the same time exerts a restoring force on the tool to enable the tool to track the curved surface as the surface curves back laterally in the opposite direction. The spacing between the front roller 226 and the rear rollers 228 is such that the tool is always correctly positioned with respect to the leading edge as the tool tracks this sideways curvature of the leading edge. The bushing 168 provides a damping force to dampen out any vibrations that might occur as a result of the slight variations and abrupt variations in the surface that may take place in this direction.

As the tool is moved along the leading edge 12, the tool 164 may encounter a region of the leading edge surface that has increased thickness. The increased thickness causes the tool to move in a direction away from the roller assemblies 216, 218 which are riding on the reference surface Rs. The movement of the tool slightly compresses the bushing 168. The bushing exerts a restoring force that is of a magnitude that does not cause chatter or skipping of the tool on the surface and acts as a damper to dampen out any vibrations that may result from the change in leading edge thickness. Thus, the bushing exerts a slight restoring force on the tool that is in a direction that is substantially perpendicular to the reference surface while permitting limited movement in this direction. A rigid connection between the tool and the probe assembly would not allow for this variation in thickness and would likely cause unacceptable gouging of the leading edge.

The tool is also useful in machining a leading edge that does not have variations in thickness, lateral curves, or chordwisely extending curves but has a surface that gently and regularly follows a contour of simple shape. In such a case, the probe assembly 166 positions the tool with respect to the leading edge as the roller assembly follows the curve, always positioning the tool from a position slightly ahead on the reference surface. Thus, the reference surface Rs and probe assembly alone act to orient the tool to take into account variations of the leading edge from a straight line but without variations in thickness or curvature that would cause chattering of the tool.

After the adjacent sections of the leading edge are formed with constant contours as shown in FIGS. 1a–1d, the adjacent constant contours are connected by blending by hand the small spanwise extent that extends between the sections. The blending provides a smooth transition between the sections of the airfoil surface. In this fashion, a leading edge of an airfoil that may extend for more than a meter is formed by machining, eliminating most of the hand labor required to form the edge region of the airfoil. Experimental work has shown that the very close tolerances may be kept for the edges of the airfoil and results from the shape of the tool and the repeatable nature of very fine cuts provided by the apparatus for contouring the leading edge. This eliminates the element of human error inherent in hand forming operations over most of the extent of the leading edge region. This greatly increases the volume of production for a given amount of time, decreases the amount of intensive hand labor and provides edges for the airfoil which are aerodynamically efficient. The resulting operation of a gas turbine engine is aerodynamically enhanced by this precisely conformed contour.

Although this invention has been shown and described with respect to the detailed embodiments thereof, it will be understood by those skilled in the art that various changes in the form and detail thereof may be made without departing from the spirit and scope of the claimed invention. For example, a probe assembly having spherical roller elements or a probe surface may be used in place of the cylindrical roller elements.

We claim:

1. A method for forming the contour of at least a portion of an edge of an airfoil having a plurality of airfoil sections, which comprises:

disposing a tool having the shape of the edge adjacent the edge so that the tool will engage the edge when reciprocated;

engaging the edge of the airfoil with the edge on the tool to position the tool on the airfoil;

engaging a spanwisely extending reference surface on the airfoil to further position the tool at each airfoil section with respect to the airfoil surface by permitting movement of the tool at that airfoil section with respect to the edge of the airfoil;

applying a force to the tool; and, removing material by repeatedly moving the tool relative to the edge in the spanwise direction while positioning the tool during travel at each airfoil section with respect to the spanwisely extending surface and with respect to the airfoil edge in response to engaging the airfoil edge and engaging the reference surface on the airfoil.

2. The method for forming the contour of claim 1 wherein the airfoil has a spanwise axis S and surfaces defined by a plurality of airfoil sections extending chordwisely wherein the step of positioning the tool includes permitting at each airfoil section limited movement of the tool with respect to the reference surface in the chordwise direction against a restoring force acting in the chordwise direction to avoid gouging and chatter marks on the airfoil as the tool is moved and positioned to form the desired contour with respect to the reference surface.

3. The method for forming the contour of claim 1 wherein the step of positioning the tool with respect to the reference surface includes permitting at each airfoil section limited movement of the tool with respect to the reference surface including permitting limited movement of the tool circumferentially about a chordwise axis against a restoring force acting in the circumferential direction.

4. The method for forming the contour of claim 2 wherein the step of positioning the tool with respect to the reference surface includes permitting at each airfoil section limited movement of the tool with respect to the reference surface including permitting limited movement of the tool circumferentially about a chordwise axis against a restoring force acting in the circumferential direction.

5. The method for forming the contour of claim 3 wherein the step of permitting limited movement of the tool with respect to the reference surface includes permitting limited movement against a restoring force acting in a direction substantially perpendicular to the reference surface.

6. The method for forming the contour of claim 4 wherein the step of permitting limited movement of the tool with respect to the reference surface includes permitting limited movement against a restoring force acting in a direction substantially perpendicular to the reference surface.

7. The method for contouring the edge of an airfoil of claim 2 wherein the step of engaging the reference surface includes engaging the surface with two rotatable surfaces attached to and disposed fore and aft of the tool in the spanwise direction and probing the reference surface continuously by rolling the rotatable surfaces on the reference surface.

8. The method for contouring the edge of an airfoil of claim 3 wherein the step of engaging the reference surface includes engaging the surface with two rotatable surfaces attached to and disposed fore and aft of the tool in the spanwise direction and probing the reference surface continuously by rolling the rotatable surfaces on the reference surface.

9. The method for contouring the edge of an airfoil of claim 4 wherein the step of engaging the reference surface includes engaging the surface with two rotatable surfaces attached to and disposed fore and aft of the tool in the spanwise direction and probing the reference surface continuously by rolling the rotatable surfaces on the reference surface.

10. The method for contouring the edge of an airfoil of claim 5 wherein the step of engaging the reference surface includes engaging the surface with two rotatable surfaces attached to and disposed fore and aft of the tool in the spanwise direction and probing the reference surface continuously by rolling the rotatable surfaces on the reference surface.

11. The method for contouring the edge of an airfoil of claim 6 the step of engaging the reference surface includes engaging the surface with two rotatable surfaces attached to and disposed fore and aft of the tool in the spanwise direction and probing the reference surface continuously by rolling the rotatable surfaces on the reference surface.

12. The method for forming the contour of claim 1 wherein the step of positioning the tool includes the step of permitting limited movement of the tool with respect to the reference surface.

13. The method for forming the contour of claim 1 wherein the step of positioning the tool includes the step engaging the reference surface with a probe.

* * * * *